United States Patent [19]

Kalsi

[11] 4,159,434
[45] Jun. 26, 1979

[54] AXIAL GAP INDUCTOR ALTERNATOR
[75] Inventor: Swarn S. Kalsi, Clifton Park, N.Y.
[73] Assignee: General Electric Company, Schenectady, N.Y.
[21] Appl. No.: 844,481
[22] Filed: Oct. 21, 1977
[51] Int. Cl.² .................................... H02K 19/24
[52] U.S. Cl. .................................... 310/168; 310/254; 310/268
[58] Field of Search ............... 310/168, 169, 171, 180, 310/184, 198, 254, 262, 268, 165, 158, 12

[56] References Cited
U.S. PATENT DOCUMENTS

| | | | |
|---|---|---|---|
| 3,261,998 | 7/1966 | Bosco et al. .............. | 310/168 X |
| 3,284,651 | 11/1966 | Wesolowski ............... | 310/168 |
| 3,445,691 | 5/1969 | Beyersdorf et al. ......... | 310/268 X |
| 3,825,782 | 7/1974 | Dassler .................... | 310/268 X |
| 3,869,626 | 3/1975 | Puttock et al. ............ | 310/268 X |

Primary Examiner—Mark O. Budd
Attorney, Agent, or Firm—Nathan D. Herkamp; Joseph T. Cohen; Leo I. MaLossi

[57] ABSTRACT

A high speed inductor alternator employs axial air gaps, enabling a nonmagnetic filler in the portion of the gap extending into the solid rotor to be securely bonded to the rotor against the action of centrifugal force. This configuration permits use of axial poles on the rotor, and results in a machine that is substantially shorter, axially, than a conventional radial air gap inductor alternator of comparable output ratings.

14 Claims, 4 Drawing Figures

AXIAL GAP INDUCTOR ALTERNATOR

This invention relates to inductor alternators, and more particularly to a high-speed inductor alternator having axial rotor poles and axial air gaps.

In high speed flywheel energy storage systems, such as used in generating mobile electrical power for electrical vehicle drive applications, limitations on volume and weight of the power generating system necessitate use of small, lightweight alternators with high power output capabilities. This, in turn, requires that the alternator operate at high speed. Conventional wound rotor alternators, however, are limited in operating speed since, at high angular velocities, mechanical stresses in the rotor windings can become excessive. Solid rotor inductor alternators, therefore, are virtual necessities at high angular velocities since only a solid rotor can withstand the centrifugal stresses incurred at the higher operating speeds. Typical of such solid rotor machine is the homopolar inductor alternator. In such machines, the rotor carries no windings and is basically comprised of solid metal, thus facilitating rotor operating speeds in excess of 100,000 RPM. The excitation field for establishing the rotor magnetic poles is situated on the stator between two radially-separated stacks of stator laminations, while a multi-phase A.C. stator winding is wound through corresponding slots in the two stator stacks.

In a flywheel energy storage system for electrical vehicle drive applications, an inductor alternator can be conveniently employed as an input/output device for supplying energy to a flywheel from a charging station or extracting energy from the flywheel to power the drive motors. These inductor alternators are conveniently of the radial air gap type; that is, the inductor alternators are each built with a radial air gap between the rotor and stator and each employs a rotor having poles made of magnetic steel. Axial slots provided between successive poles in the rotor are normally filled with a nonmagnetic metal for reducing windage losses. These axial slots cause the radial air gap permeance to vary as the rotor rotates with respect to the stator. The permeance variation causes pulsations in the magnetic flux linking the stator or armature winding. Each flux pulsation goes from a very high value at the rotor position of large permeance to a very low value at the rotor position of low permeance, inducing an alternating current in the armature winding. A limitation on designing these machines for very high speed operation, however, is the usually poor strength of the bond between dissimilar metals in the region of the inductor rotor which is highly stressed by centrifugal force. It would be desirable to overcome this limitation on speed of the machine.

Since the amount of energy that can be stored in a flywheel is a function of the square of its angular velocity, the need for high angular velocity in order to store a large amount of energy in the flywheel is self-evident. The high speed at which the flywheel is thus intended to operate without flying apart necessitates use of a disk-shaped flywheel. In addition to the disk-shaped construction, a further constraint in designing a flywheel energy storage system is that the system must be capable of operating within a confined volume in order to maximize the vehicle payload. If the flywheel is also made an integral part of the inductor alternator with which it operates in unison, the compactness of the inductor alternator-flywheel combination provides the vehicle designer with additional freedom in designating the volume in which the inductor alternator-flywheel combination is to be installed.

Accordingly, one object of the invention is to provide a high speed inductor alternator rotor with a high power-to-density ratio.

Another object is to provide an inductor alternator having a rotor speed limited only by the tensile strength of the rotor metal.

Another object is to provide an inductor alternator capable of high energy storage, having a relatively short axial dimension.

Briefly, in accordance with a preferred embodiment of the invention, a high speed inductor alternator comprises a metallic stator frame having a circular channel formed in an axial face thereof, a circular excitation winding situated within the channel formed in the axial face of the stator, and cylindrically-rolled laminations of magnetic steel embedded within the channel on either radial side of the circular excitation winding. A.C. armature windings are situated with each individual conductor thereof extending radially across the excitation winding and the laminations on either side of the excitation winding. A metallic rotor having an axial face situated closely adjacent the A.C. armature windings and containing an even number of axially-directed arcuate slots is provided. The slots are each of substantially identical size and shape, and are filled with nonmagnetic material. Both slots of each alternate pair of diametrically-opposite arcuate slots are located radially-outward of the circular excitation winding.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
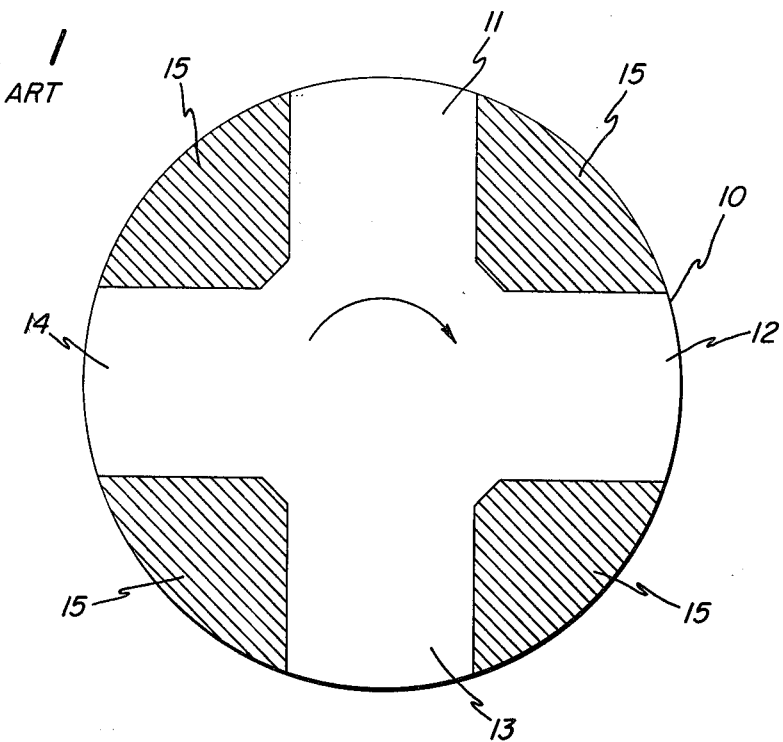
FIG. 1 is a simplified, cross sectional view of a homopolar inductor alternator rotor of conventional construction, having four poles.

FIG. 1 is a cross sectional view of one axial end of a conventional eight pole radial gap inductor alternator rotor 10, showing only four radial poles 11, 12, 13 and 14 of magnetic material. The remaining four radial poles are displaced axially by 45° and located at the other axial end of rotor 10. The cooperating stator (not shown) encircles, and is spaced slightly apart from, rotor 10, by a distance constituting a radial air gap. A machine of this type is described in greater detail in J. S. Hickey application Ser. No. 806,599, filed June 15, 1977 and assigned to the instant assignee.

To reduce windage losses when rotating in the direction of the arrow, the axial regions or slots between consecutive poles in the apparatus of FIG. 1 are typically filled with nonmagnetic material 15, such as Inconel 718, a nickel chromium alloy available from Huntington Alloys, Huntington, W. Va. Nonmagnetic filler 15 is normally affixed to the rotor body (which may typically be fabricated of ASA 4340 magnetic steel) by a metallic bond. However, the bond of two dissimilar metals may be inadequate to withstand the very high centrifugal stresses to which the rotor is subjected at its normally high angular velocity. This problem, however, is easily solved by the axial gap machine shown in FIG. 2.

Figure 2:
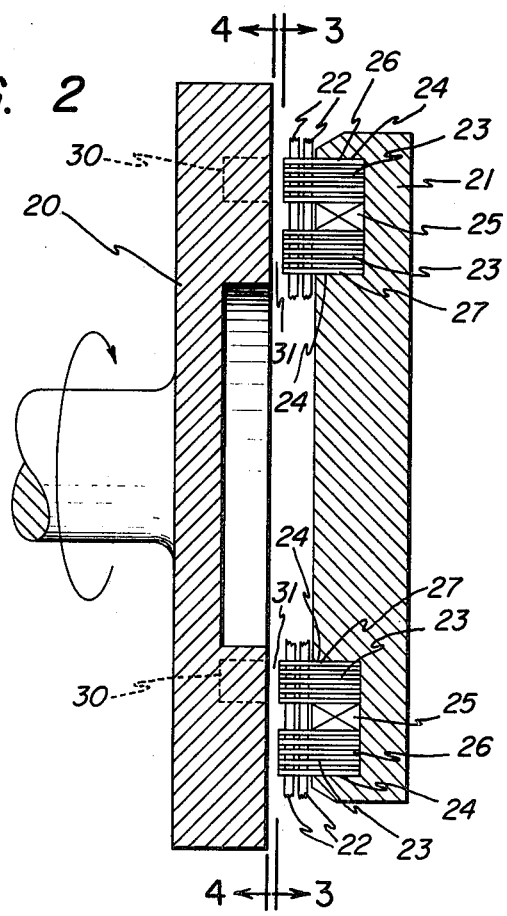
FIG. 2 is a sectional view taken axially through an inductor alternator constructed in accordance with the teachings of the instant invention.
Figure 3:
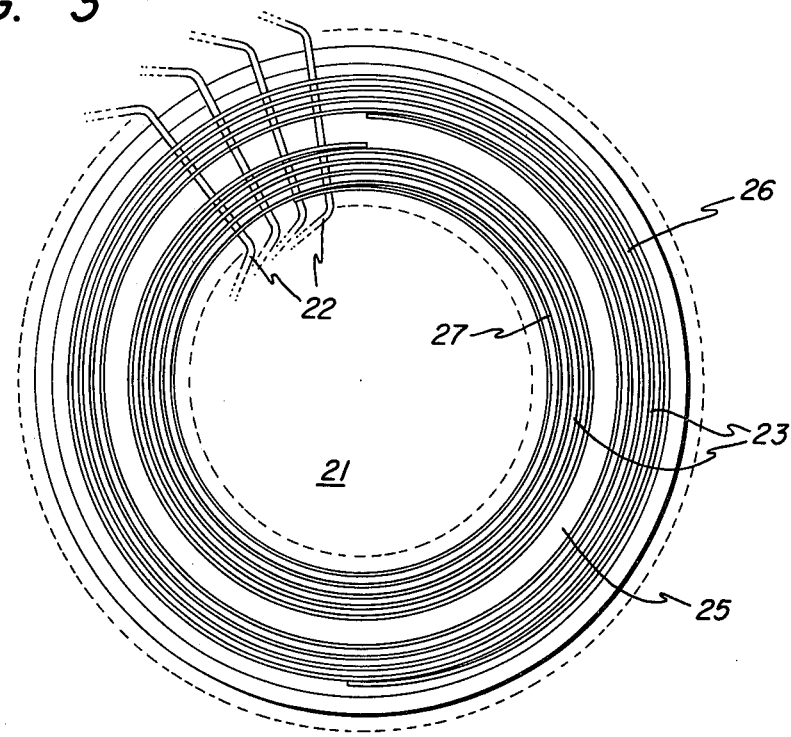
FIG. 3 is a sectional view taken along line 3—3 in the apparatus of FIG. 2.

A sectional view of a four-pole axial gap inductor alternator is shown in FIG. 2 as comprising a solid rotor 20 and a stator frame 21 in facing relationship. Rotor 20 is made from magnetic steel, such as ASA 4340. As illustrated in FIG. 3, which is a sectional view taken along line 3—3 in FIG. 2, three-phase alternating current winding 22 is carried in radially-directed slots cut into stator core 23 which is formed by rolling two thin sheets of magnetic steel and inserting the rolled laminations 26 and 27 thus formed into a supporting channel defined radially by shoulders 24 in stator frame 23. The slots for holding windings 22 are cut into the exposed edges of rolled laminations 26 and 27. Although not shown for simplicity of illustration, those skilled in the art will appreciate that armature windings 22 extend circumferentially around the entire excitation winding 25 and stator core 23 in a plane between rotor 20 and stator frame 21, and are interconnected in a manner well known in the linear inductor machine art to form a flat, so-called "pancake" coil comprising two layers of armature turns or bars. The stator frame is also constructed of magnetic steel, such as AISI 1010. A circular D.C. excitation winding 25 of rectangular cross-section is held between radially-inner stator core portion 27 and radially-outer stator core portion 26 by a shrink fit in the channel defined by shoulders 24 in stator frame 23.

Figure 4:
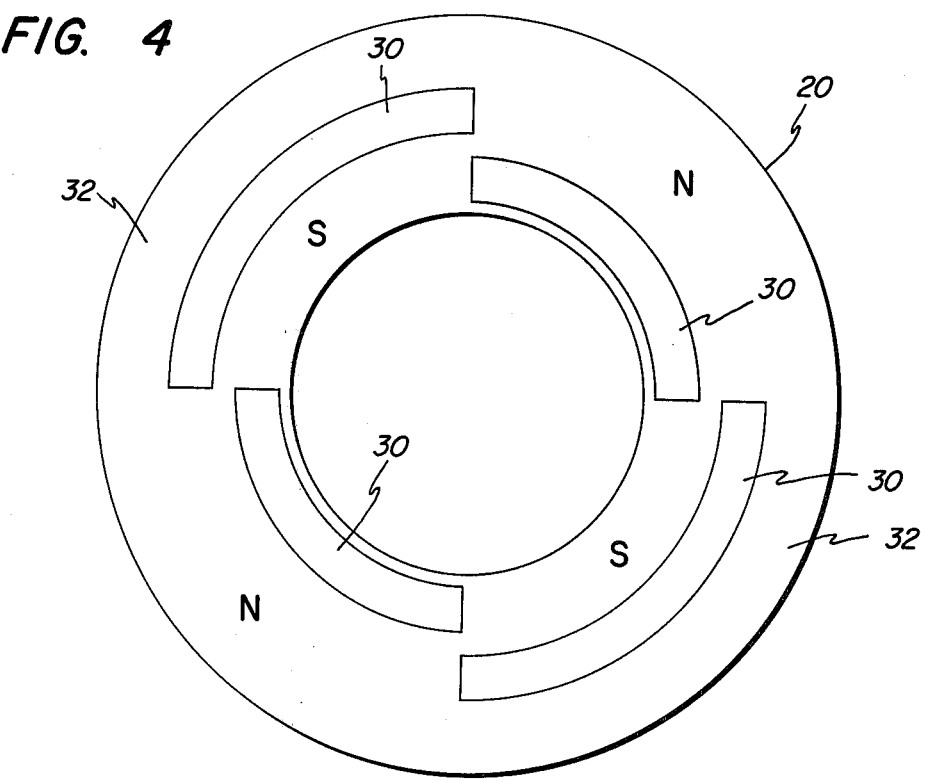
FIG. 4 is a sectional view taken along line 4—4 in the apparatus shown in FIG. 2.

The surface of rotor 20 facing armature windings 22 contains an even number of axially-directed arcuate slots of substantially identical size and shape which are filled with nonmagnetic filler material 30 to minimize windage loss. These nonmagnetic regions in the rotor may comprise a nickel chromium alloy, such as Inconel 718, and produce permeance variation in air gap 31 between rotor 20 and stator core 23 as the rotor turns. As illustrated in FIG. 4, which is a sectional view taken along line 4—4 in FIG. 2, nonmagnetic regions 30 of rotor 20 are staggered radially by one pole pitch so that the nonmagnetic regions of one pair of diametrically-opposite nonmagnetic regions 30 are located radially-outward of circular excitation winding 25 and those nonmagnetic regions of the remaining pair of diametrically-opposite nonmagnetic regions 30 are located radially-inward of the circular excitation winding. Staggering of the nonmagnetic regions allows use of straight armature bars 22.

Filler metal 30 is preferably held in place within rotor 20 by a braze joint. Additional support for filler material 30 against centrifugal stresses may be provided by a collar 32 machined out of the metal of rotor 20. No windings are carried by the rotor which, in the embodiment illustrated in FIG. 3, is undercut radially-inward of stator core 23 so as to situate a greater proportion of the rotor mass near the rotor circumference and thereby retain most of the rotor's potential for energy storage while also achieving a rotor weight reduction.

In operation, D.C. energization of excitation winding 25 induces magnetic poles in the magnetic portions of rotor 20 at air gaps 31 by establishing magnetic flux through a path including stator core 23 and the portion of stator frame 21 abutting the edges of stator core laminations 26 and 27. Thus, as indicated in FIG. 4, poles of one polarity, designated N, are continuously induced in the portions of rotor 20 radially-outward of nonmagnetic regions 30 while poles of the opposite polarity, designated S, are continuously induced in the portions of rotor 20 radially-inward of nonmagnetic regions 30. In the case of alternator operation, movement of these poles of alternating polarity past armature windings 22 as the result of rotor 20 being rotationally driven by a prime mover (not shown) induces an alternating current in each individual bar of the armature windings. This current results from the change in air gap permeance thus effected, which alternates from a very high value to a very low value opposite each of stator core laminations 26 and 27. These permeance variations cause the magnetic flux linking the armature winding to pulsate between a high and low value so as to induce the alternating current in the armature winding. Windings 22 are interconnected in a manner to sum the currents induced therein, so as to provide a relatively large three phase A.C. power output. In motor operation, armature windings 22 are energized with alternating current so as to create a varying electromagnetic field that interacts with the poles induced on rotor 20, thereby causing the rotor to turn. Being that the inductor alternator described herein basically operates in a manner similar to that of a synchronous machine, it provides the advantages of voltage regulation and power factor regulation inherent in synchronous machines.

It will be noted that rotor 20 essentially comprises a composite disk fabricated of magnetic and non-magnetic materials, while stator frame 23 is also generally disk-shaped. This facilitates construction of the axial gap machine with an axial dimension substantially shorter than that for a radial gap machine of comparable output parameters. The axial dimension of an inductor machine-flywheel system can thereby be made relatively small. Moreover, a disk-type rotor itself acts as a flywheel so as to furnish a high ratio of power to density (and hence power to weight ratio) to such system while the rotor speed is limited only by the strength of the parent or magnetic metal. These features make the axial gap machine ideally suited for vehicular drive application. In addition, the simple construction of the axial gap machine of the instant invention facilitates its manufacture.

The foregoing describes a high speed inductor alternator rotor with a high power-to-density ratio, whose speed is limited only by the tensile strength of the rotor material. The axial dimension of the inductor alternator is substantially shorter than that for a radial gap inductor alternator of comparable output parameters.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:
1. A high speed inductor alternator comprising:
   a metallic stator frame having a circular channel formed in an axial face thereof;
   a circular excitation winding situated within said channel;

a stator core embedded within said channel on either radial side of said circular excitation winding;

A.C. armature windings extending radially across said excitation winding and said stator core on either radial side of said circular excitation winding; and a metallic rotor having an axial face situated closely adjacent said A.C. armature windings and containing an even number of axially-directed arcuate slots, said slots each being of substantially identical size and shape and being filled with nonmagnetic material, each alternate pair of diametrically-opposite filled arcuate slots being located radially-outward of said circular excitation winding and the remaining pairs of diametrically-opposite filled arcuate slots being located radially-inward of said circular excitation winding.

2. The apparatus of claim 1 wherein said stator core is comprised of circular laminations of magnetic steel.

3. The apparatus of claim 2 wherein said excitation winding is of rectangular cross section.

4. The apparatus of claim 1 wherein said nonmagnetic material comprises a nickel chromium alloy.

5. The apparatus of claim 2 wherein said nonmagnetic material comprises a nickel chromium alloy.

6. The apparatus of claim 4 wherein said excitation winding is of rectangular cross section.

7. The apparatus of claim 5 wherein said excitation winding is of rectangular cross section.

8. The apparatus of claim 1 wherein said armature windings are embedded in radial slots in said stator core.

9. The apparatus of claim 2 wherein said armature windings are embedded in radial slots formed on the exposed edges of said laminations.

10. The apparatus of claim 7 wherein said armature windings are embedded in radial slots formed on the exposed edges of said laminations.

11. The apparatus of claim 1 wherein said axial face of said metallic rotor is undercut radially-inward of said stator core.

12. A high speed inductor alternator comprising:
a metallic stator frame having a circular channel formed in an axial face thereof;

a circular excitation winding of rectangular cross section situated within said channel and adapted for D.C. energization;

cylindrically-rolled laminations of magnetic steel embedded within said channel on either radial side of said circular excitation winding and having radial slots formed on the exposed edges thereof;

three phase A.C. armature windings embedded in said radial slots formed on the edges of said laminations; and a metallic disk having an axial face situated closely adjacent said A.C. armature windings and containing an even number of axially-directed arcuate slots, said slots each being of substantially identical size and shape and being filled with a nonmagnetic metal, each alternate pair of diametrically-opposite filled arcuate slots being located radially-outward of said circular excitation winding and the remaining pairs of diametrically-opposite filled arcuate slots being located radially-inward of said circular excitation winding.

13. The apparatus of claim 12 wherein said nonmagnetic material comprises a nickel chromium alloy.

14. The apparatus of claim 12 wherein said axial face of said metallic disk is undercut radially-inward of said stator core.

* * * * *